(12) United States Patent
Rowe et al.

(10) Patent No.: US 7,464,460 B2
(45) Date of Patent: Dec. 16, 2008

(54) METHOD OF METALLURGICALLY BONDING A STATOR BAR

(75) Inventors: Raymond Grant Rowe, Niskayuna, NY (US); Alan Michael Iversen, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 11/276,009

(22) Filed: Feb. 9, 2006

(65) Prior Publication Data

US 2006/0160389 A1 Jul. 20, 2006

Related U.S. Application Data

(62) Division of application No. 10/249,685, filed on Apr. 30, 2003, now Pat. No. 7,073,247.

(51) Int. Cl.
*H01R 43/02* (2006.01)
(52) U.S. Cl. ............... 29/860; 29/402.2; 29/402.07; 29/402.16; 29/402.18; 29/596; 29/854; 29/890.054; 228/180.5; 228/262.9; 310/42; 310/54; 310/71
(58) Field of Classification Search ............ 29/402.02, 29/402.07, 402.16, 402.18, 854, 860, 890.054; 228/180.5, 119, 262.9; 310/42, 54, 71
See application file for complete search history.

(56) References Cited

U.S. PATENT DOCUMENTS 5,581,869 A * 12/1996 Travaly .................... 29/596
5,796,189 A * 8/1998 Manning et al. ............ 310/54

* cited by examiner

*Primary Examiner*—Thiem Phan
(74) *Attorney, Agent, or Firm*—Hartman & Hartman, P.C.; Gary M. Hartman; Domenica N. S. Hartman

(57) ABSTRACT

A method for metallurgically bonding a stator bar to a coupling to reduce the incidence of leak paths resulting from corrosion. The stator bar comprises strands through which a liquid coolant can flow. Adjacent ends of the strands are received in an interior cavity of the coupling through an opening in the coupling. A joining material is provided on a first portion of the stator bar within the coupling opening and adjacent the ends of the strands. The first portion is heated to melt the joining material. At essentially the same time, a second portion of the stator bar outside the coupling is also heated. Once the joining material is suitably molten, the first portion is allowed to cool while the second portion remains heated, thereby causing the joining material nearest the ends of the strands to solidify first.

11 Claims, 1 Drawing Sheet

METHOD OF METALLURGICALLY BONDING A STATOR BAR

CROSS REFERENCE TO RELATED APPLICATIONS

This is a division patent application of U.S. patent application Ser. No. 10/249,685, filed Apr. 30, 2003 now U.S. Pat. No. 7,073,247. The contents of this application are incorporated herein by reference.

BACKGROUND OF THE INVENTION

The present invention generally relates to the stator bar end connections of a liquid-cooled generator. More particularly, this invention relates to a method of metallurgically joining copper conductors of a stator bar to a fluid coupling, whereby the joint is solidified in a manner that reduces the incidence of defect-induced corrosion.

Stator bars of a liquid-cooled electrical generator typically comprise a combination of solid and hollow copper strands, with opposing ends of the strands being brazed to a fluid coupling, referred to herein as a clip. The clip serves as both an electrical and fluidic connection for the stator bar. For purposes of the latter, the clip defines an interior chamber, referred to as a water box, into which the ends of the strands extend through an opening in the clip to permit flow of a liquid coolant, typically deionized water, between the clip and hollow strands. The coolant flows to or from the clip through a hose coupled to a hose connection of the clip. A braze metal metallurgically bonds the strands to each other and joins the clip to the peripherally outermost strands of the stator bar. Brazing is typically performed by placing a braze alloy, such as a preform formed of the alloy, between the strands and clip, and then heating the strands and clip with a torch or by induction heating to cause the braze alloy to melt and flow by capillary action. Once solidified, the braze alloy metallurgically bonds the strands to each other and to the fluid coupling so as to form a fluid-tight brazement between the stator bar and clip.

Over time, leaks may develop at the bar-clip connection as a result of the development of a leak path between strands and/or between strands and the clip. As reported in commonly-assigned U.S. Pat. Nos. 5,605,590 and 5,796,189, both to Manning et al., one leak mechanism that has been identified is attributed to corrosion of the braze alloy. Corrosion is believed to be initiated by stagnant water residing within concave pockets that are present in the surface of the brazement between the strands and clip. While Manning et al. disclose techniques by which the incidence of leakage can be reduced, there is an ongoing effort to further reduce the likelihood of leaks in view of the considerable downtime and cost involved in repairing such leaks.

BRIEF SUMMARY OF THE INVENTION

The present invention provides a method for metallurgically bonding a stator bar to a fluid coupling in a manner that reduces the incidence of leak paths resulting from corrosion. The stator bar is of the type comprising a group or bundle of strands, at least some of which are hollow so that a cooling fluid can flow through the stator bar and fluid coupling for the purpose of cooling the stator bar. Adjacent ends of the strands are received in an interior cavity of the fluid coupling through an opening in the fluid coupling. The method of this invention is capable of reducing the incidence of leakage between the strands and the coupling by controlling the manner in which the material used to metallurgically bond the strands and coupling is solidified.

The method generally involves providing the joining material on a first portion of the group of strands that is within the opening of the fluid coupling and adjacent the ends of the strands. A first heating means is placed in proximity to the opening of the fluid coupling, and a second heating means is placed in proximity to a second portion of the group of strands that is outside the opening. The first heating means is then operated to sufficiently heat the first portion of the group of strands to melt the joining material. The second heating means is also operated to heat the second portion of the group of strands. Once the joining material is suitably molten, the first heating means is operated to allow the first portion of the group of strands to cool and thereby solidify the joining material nearest the ends of the strands. However, the second heating means is operated further to continue heating the second portion of the group of strands. The second heating means is operated to allow the second portion of the group of the strands to cool in a manner that causes the joining material at the first portion of the group of strands to solidify in a direction away from the ends of the strands and toward the second portion. Once solidified, the joining material forms a joint that metallurgically bonds the strands to each other and the first portion of the group of strands to the fluid coupling.

As a result of the directional solidification of the joining material at the joint between the stator bar and fluid coupling, solidification-related surface defects that may form in the joint are concentrated in a region of the joint farthest from the ends of the strands. According to the invention, by eliminating or at least significantly reducing the presence of defects in the surface of the joint contacted by the coolant flowing through the strands and fluid coupling, the incidence of corrosion brought on by crevice corrosion can be significantly reduced. As a result, leaks attributed to the onset of crevice corrosion are less likely to occur.

Other objects and advantages of this invention will be better appreciated from the following detailed description.

DETAILED DESCRIPTION OF THE INVENTION

Figure 1:
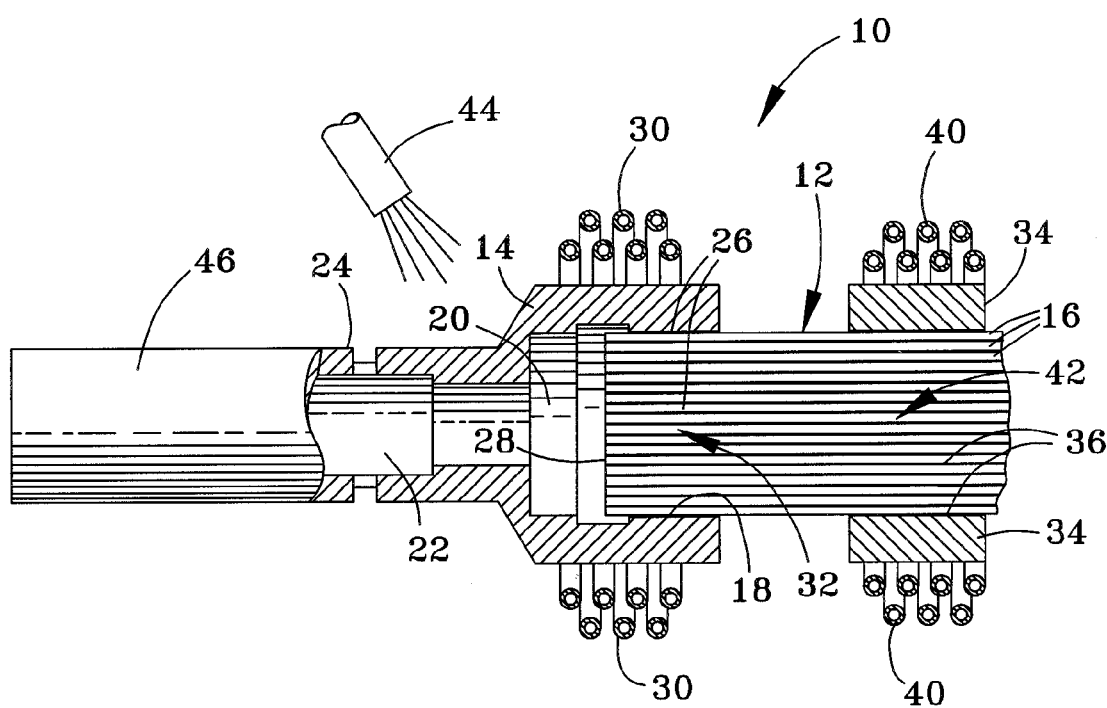
FIG. 1 is a fragmentary cross-sectional view of a stator bar-clip connection undergoing a brazing operation in accordance with an embodiment of the present invention.

FIG. 1 represents a liquid-tight connection 10 between a liquid-cooled stator bar 12 and a fluid coupling, referred to herein as a clip 14. The connection 10, stator bar 12 and clip 14 are representative of components found in a liquid-cooled generator. Those skilled in the art will appreciate that the appearance and construction of the connection 10 are merely representative, and that the teachings of this invention are applicable to a variety of other situations where a fluid-tight joint is desired.

As illustrated in FIG. 1, the stator bar 12 includes a plurality of strands 16, at least some of which are hollow for carrying a liquid coolant to or from the clip 14. The strands 16 are typically assembled to form a bundle comprising an array of strands 16, with additional strands 16 being positioned behind those visible in FIG. 1. The strands 16 are arranged so that their ends 28 are adjacent each other and roughly coplanar, with the exception being that hollow strands 16 preferably protrude beyond any solid strands 16 present in the bundle (for reasons that will become apparent from the following discussion). The strands 16 are formed of an electrically-conductive material, such as copper. In the embodiment depicted in FIG. 1, the clip 14 is also formed of an electrically-conductive material, such as copper, to enable the clip 14 to conduct current to or from the bar 12. The clip 14 is shown as having a closed body with an opening 18 at one end for receiving the strands 16 of the stator bar 12. The clip 14 further has an interior cavity 20 and a passage 22. The passage 22 is within a portion of the clip 14 that defines a fitting 24 to which a tube (not shown) can be coupled to provide both an electrical connection to the stator bar 12 and a fluidic connection for a liquid coolant, e.g., deionized water, flowing through the stator bar 12. Alternatively, the clip 14 could be configured so that the electrical connection to the stator bar 12 is provided by a component other than the tube coupled to the fitting 24.

According to conventional practice, the strands 16 are metallurgically bonded to each other as well as to the interior wall that defines the opening 18 of the clip 14. A preferred material for forming this bond is a brazing material, such as a copper-phosphorous alloy, though the use of other bonding materials is foreseeable. Brazing material in the form of a paste, one or more solid preforms, etc., is typically placed in and around the ends 28 of the strands 16, which are then inserted into the opening 18 of the clip 14. Heating the clip 14 (such as with an induction coil 30 as shown in FIG. 1) causes the brazing material to melt and flow, which is then allowed to cool to form a brazement 26 that metallurgically bonds the strands 16 together within the opening 18, and therefore within the portion 32 of the stator bar 12 nearest the ends 28 of the strands 16. Arranging the strands 16 so that hollow strands 16 protrude beyond any solid strands 16 present in the bundle serves to inhibit the flow of the molten braze material into the open ends of the hollow strands 16. As indicated in FIG. 1, the brazement 26 also serves to bond this portion 32 of the stator bar 12 to the clip 14. As such, the brazement 26 is required to form a liquid-tight joint between the individual strands 16 of the stator bar 12 and between the clip 14 and the strands 16 located at the perimeter of the stator bar 12.

As reported in commonly-assigned U.S. Pat. Nos. 5,605,590 and 5,796,189 to Manning et al., it has been observed that leaks occurring within connections of the type shown in FIG. 1 can be initiated by corrosion of the brazement 26 near the ends 28 of the strands 16 as a result of being in contact with the liquid coolant. Corrosion can progress between strands 16 and/or between the clip 14 and one or more strands 16 until a continuous leak path extends completely through the brazement 26 to the exterior of the clip 14. Manning et al. further reported that corrosion of the brazement 26 is promoted as a result of stagnant liquid coolant within pockets defined in the surface of the brazement 26 near the strand ends 28. While Manning et al. successfully reduce the incidence of leakage by eliminating such pockets or sealing the leakage paths at the surface of the brazement 26, investigations leading to the present invention showed that crevice corrosion can be initiated as a result of very small solidification defects, such as those formed by gas porosity, at the surface of the brazement 26 contacting the coolant. These investigations determined that such defects are concentrated in the brazement 26 near the ends 28 of the strands 16, and therefore in the very region of the brazement 26 that is most prone to corrosion as a result of being in contact with the coolant. The basis for the concentration of solidification defects near the ends 28 of the strands 16 was attributed to the considerably greater thermal mass of the stator bar 12 as compared to the clip 14, resulting in the stator bar 12 acting as a heat sink so that the molten brazing material farthest from the ends 28 of the strands 16 solidifies first, with solidification then proceeding through the opening 18 in the clip 14 toward the ends 28 of the strands 16. As solidification proceeds, gas bubbles and solidification shrinkage defects tend to be concentrated in the last liquid metal to solidify, and therefore at the surface of the brazement 26 near the strand ends 28, where they form surface defects.

As a solution, the present invention provides a method of forming the brazement 26 so that solidification defects that may form in the brazement 26 tend to accumulate or otherwise become concentrated in a region of the brazement 26 away from the strand ends 28, preferably in the region of the brazement 26 adjacent the exterior of the clip 14. To achieve this result, the process of cooling the brazing material to form the brazement 26 is controlled so that the brazing material initially solidifies adjacent the ends 28 of the strands 16, and thereafter solidifies in the direction toward the exterior of the clip 14. In so doing, gas porosity and other solidification defects that form during cooling tend to accumulate within the region of the brazement 26 farthest from the strand ends 28, and therefore out of contact with the liquid coolant, while the region of the brazement 26 that contacts the liquid coolant within the clip 14 (i.e., adjacent the strand ends 28) is substantially defect-free. Because crevice corrosion will not occur if an initial crevice (e.g., a surface defect) is not present, the present invention effectively eliminates or at least significantly reduces the occurrence of leak paths initiated by crevice corrosion in the brazement 26. This advantage of the invention can be achieved alone or in addition to the techniques taught by Manning et al. for avoiding other causes of corrosion in the brazement 26.

FIG. 1 represents several techniques, some optional, for achieving the above. As discussed above, a first brazing material is provided on the portion 32 of the stator bar 12 (i.e., the bundle of strands 16) that will be positioned within the opening 18 of the clip 14. According to a preferred aspect of the invention, brazing material is also provided on a second portion 42 of the stator bar 12 spaced apart from the clip 14. In FIG. 1, the second portion 42 is surrounded by an annular-shaped fitting 34 that is positioned some distance from the clip 14. For example, if the stator bar 12 has a cross-section of about 2 by about 6 cm, the fitting 34 may be placed about 1 to about 3 cm from the clip 14. Alternatively, the fitting 34 could be placed immediately adjacent but out of direct thermal contact with the clip 14, so that heat is not conducted directly between the clip 14 and fitting 34 during the subsequent brazing operation, and the brazing materials do not flow into the gap therebetween and commingle during brazing to form a unitary brazement. To ensure the latter, a thermal-insulating spacer (not shown) could be positioned between the clip 14 and fitting 34.

In FIG. 1, the induction coil 30 is shown as being positioned in proximity to the opening 18 in the clip 14 so as to surround the portion 32 of the stator bar 12. Similarly, a second induction coil 40 is shown is being in proximity to the fitting 34 so as to surround the second portion 42 of the stator bar 12. During the brazing operation of this invention, the induction coils 30 and 40 are energized to heat the first and second portions 32 and 42, respectively, of the stator bar 12 and thereby melt each of the brazing materials. As with the clip 14, the fitting 34 is preferably formed of copper or an alloy thereof. However, the fitting 34 could be formed of a variety of other materials that will metallurgically bond to the strands 16. The material for the fitting 34 can be chosen to have a higher electrical resistance than the material of the clip 14 in order to couple more effectively with the induction coil 40 to achieve a greater heating effect. For example, if the clip 14 is formed of copper, there are various copper alloys (e.g., brass) that will achieve this effect for the fitting 34.

Once the brazing material located in the first portion 32 of the stator bar 12 is suitably melted and has flowed by capillary action to wet the surfaces of the strands 16 within the first portion 32, the induction coil 30 can be de-energized to allow the first portion 32 of the stator bar 12 to cool and thereby initiate solidification of the brazing material. During this time, the second induction coil 40 continues to heat the fitting 34 and the portion 42 of the stator bar 12 within. As a result, the brazing material nearest the ends 28 of the strands 16 begins to solidify first, while the remaining brazing material, including the balance within the portion 32 of the stator bar 12 and all of the material within the portion 42 of the stator bar 12, remains in a molten state. With the induction coil 30 de-energized and the induction coil 40 energized, the brazing material within the portion 32 of the stator bar 12 gradually solidifies in a direction away from the ends 28 of the strands 16 and toward the second portion 42 of the stator bar 12. This phase of the process is preferably continued until all of the brazing material within the portion 32 has solidified. The second induction coil 40 is eventually de-energized to allow the second portion 42 of the stator bar 12 to cool and thereby cause the brazing material within to also solidify. At the conclusion of this process, the brazing materials have formed brazements 26 and 36 that metallurgically bond the strands 16 to each other and the portions 32 and 42 of the stator bar 12 to the clip 14 and fitting 34, respectively, with the brazement 26 being fluid-tight to prevent leakage from the connection 10. Importantly, any surface defects that might have formed in the brazement 26 are concentrated in a region of the brazement 26 farthest from the ends 28 of the strands 16 (i.e., immediately adjacent the outer extremity of the clip opening 18) as a result of the directional solidification of the brazing material within the portion 32 of the stator bar 12.

Those skilled in the art will appreciate from the above that the fitting 34 could be eliminated, such that the portion 42 of the stator bar 12 is directly heated by the induction coil 40. However, the fitting 34 is preferably used because it provides a long, continuous conduction path to the portion 42 and, if formed of a higher-resistance metal, enables more efficient heating of the portion 42. FIG. 1 represents the use of additional techniques that, in combination with the techniques described above, can promote the desired directional solidification of the brazement 26. For example, a gas jet 44 can be directed at the clip 14 during cooling to further ensure that the brazing material within the portion 32 of the stator bar 12 will begin to solidify at the ends 28 of the strands 16, instead of near the external entrance to the opening 18. FIG. 1 also schematically represents a heat sink 46 as being thermally coupled to the clip 14. In one embodiment, the heat sink 46 may be bonded (e.g., brazed) or mechanically fastened to the clip 14. Alternatively, the heat sink 46 may be an integral portion of the clip 14, e.g., a part of the casting from which the clip 14 is machined. In either case, the heat sink 46 is removed (e.g., debonded, unfastened or cut) from the clip 14 once the brazements 26 and 36 have solidified.

While the invention is described above as making use of induction coils 30 and 40 to heat the clip 14 and fitting 34, other heating devices could be used, a notable example being torches whose separate flames are directed at the clip 14 and fitting 34. Furthermore, while the fitting 34 is described as being brazed to the stator bar 12 simultaneously with the clip 14, the fitting 34 could be brazed to the stator bar 12 prior to assembling the stator bar 12 with the clip 14. However, this approach would require cleaning the strands 16 a second time before assembly with the clip 14.

In view of the above, while the invention has been described in terms of one or more particular embodiments, it is apparent that other forms could be adopted by one skilled in the art. Therefore, the scope of the invention is to be limited only by the following claims.

The invention claimed is:

1. A method of metallurgically bonding a stator bar to a coupling having an interior cavity and an exterior opening thereto, the stator bar comprising a bundle of metal strands having adjacent ends, the method comprising the steps of:
    providing a first brazing material on a first portion of the stator bar adjacent the ends of the strands and providing a second brazing material on a second portion of the stator bar spaced apart from the first portion;
    assembling the stator bar with the coupling and an annular-shaped fitting so that the ends of the strands are received in the coupling through the opening thereof, the first portion of the stator bar is within the opening, and the second portion of the stator bar is outside the opening;
    placing a first heating means in proximity to the coupling and placing a second heating means in proximity to the annular shaped fitting;
    operating the first heating means to heat the coupling and the first portion therein and thereby melt the first brazing material, and operating the second heating means to heat the annular shaped fitting and the second portion therein and thereby melt the second brazing material;
    operating the first heating means to allow the first portion of the stator bar to cool and thereby initiate solidification of the first brazing material nearest the ends of the strands while continuing to operate the second heating means to maintain the second brazing material in a molten state, the first brazing material solidifying in a direction away from the ends of the strands and toward the second portion of the stator bar; and then
    operating the second heating means to allow the second portion of the stator bar to cool and thereby cause the second brazing material to solidify;
    wherein the first brazing material metallurgically bonds the strands to each other and the first portion of the stator bar to the coupling so as to form a fluid-tight first brazement therebetween, the second brazing material forms a second brazement that metallurgically bonds the second portion of the stator bar to the annular shaped fitting, and any surface defects in the first brazement are concentrated in a region of the first brazement farthest from the ends of the strands as a result of the directional solidification of the first brazing material.

2. The method according to claim 1, wherein the strands, the coupling and the fitting are formed of copper or alloys thereof.

3. The method according to claim 1, wherein the coupling and the fitting are formed of first and second materials, respectively, and the second material has a higher electrical resistivity than the first material.

4. The method according to claim 1, wherein at least some of the strands are hollow and a remainder of the strands are not hollow.

5. The method according to claim 1, wherein the first and second heating means are induction coils.

6. The method according to claim 1, further comprising the step of directing a cooling gas at the coupling to promote cooling and solidification of the first brazing material before solidification of the second brazing material.

7. The method according to claim 1, wherein the coupling further comprises a heat sink thermally coupled thereto, the method further comprising the step of removing the heat sink after the step of operating the second heating means to allow the second portion of the stator bar to cool.

8. The method according to claim 7, wherein the heat sink is mechanically fastened to the coupling, and the step of removing the heat sink comprises unfastening the heat sink from the coupling.

9. The method according to claim 7, wherein the heat sink is an integral portion of the coupling, and the step of removing the heat sink comprises cutting the heat sink from the coupling.

10. The method according to claim 1, wherein the fitting is immediately adjacent but spaced apart from the coupling.

11. The method according to claim 1, wherein the first brazing material completely solidifies before the second heating means is operated to cool the second portion of the stator bar.

* * * * *